(12) United States Patent
Chen et al.

(10) Patent No.: US 12,202,354 B1
(45) Date of Patent: Jan. 21, 2025

(54) HIERARCHICAL CONTROL METHOD OF TORQUE DISTRIBUTION FOR WHEEL HUB MOTOR-DRIVEN ELECTRIC VEHICLES

(71) Applicant: Guangxi University, Nanning (CN)

(72) Inventors: Yong Chen, Nanning (CN); Binglong Zhong, Nanning (CN); Qiqian Jin, Lishui (CN); Mingkui Niu, Lishui (CN); Tiancheng Ouyang, Nanning (CN)

(73) Assignee: Guangxi University, Nanning (CN)

( * ) Notice: Subject to any disclaimer, the term of this patent is extended or adjusted under 35 U.S.C. 154(b) by 0 days.

(21) Appl. No.: 18/813,033

(22) Filed: Aug. 23, 2024

(30) Foreign Application Priority Data

Dec. 13, 2023 (CN) .......................... 202311711910.6

(51) Int. Cl.
*B60L 15/20* (2006.01)
*B60K 7/00* (2006.01)
*G06N 7/02* (2006.01)

(52) U.S. Cl.
CPC ............ *B60L 15/20* (2013.01); *B60K 7/0007* (2013.01); *G06N 7/02* (2013.01); *B60L 2240/423* (2013.01)

(58) Field of Classification Search
None
See application file for complete search history.

(56) References Cited

U.S. PATENT DOCUMENTS 11,161,418 B2 * 11/2021 Yamane .................. B60L 3/102

* cited by examiner

*Primary Examiner* — Todd Melton

(57) ABSTRACT

A hierarchical control system for torque distribution of hub motor-driven electric vehicles constructs a hierarchical controller with upper and lower layers. An upper layer torque distribution controller's drive torque distribution control strategy is determined through a fuzzy control module. A lower layer torque distribution controller receives the torque, yaw velocity, and side-slip angle from the upper layer torque distribution controller and performs drive torque distribution control based on the motor efficiency map or tire slip rate by using the torque, yaw velocity, side-slip angle and actual values of vehicle feedback to obtain a generalized torque output to a wheel hub motor model for calculating to obtain a target torque and inputting it into a 7-degree-of-freedom vehicle model. The 7-degree-of-freedom vehicle model feeds back vehicle states to the upper layer torque distribution controller to form a closed-loop control, achieving energy-saving control and improving handling stability and safety.

6 Claims, 1 Drawing Sheet

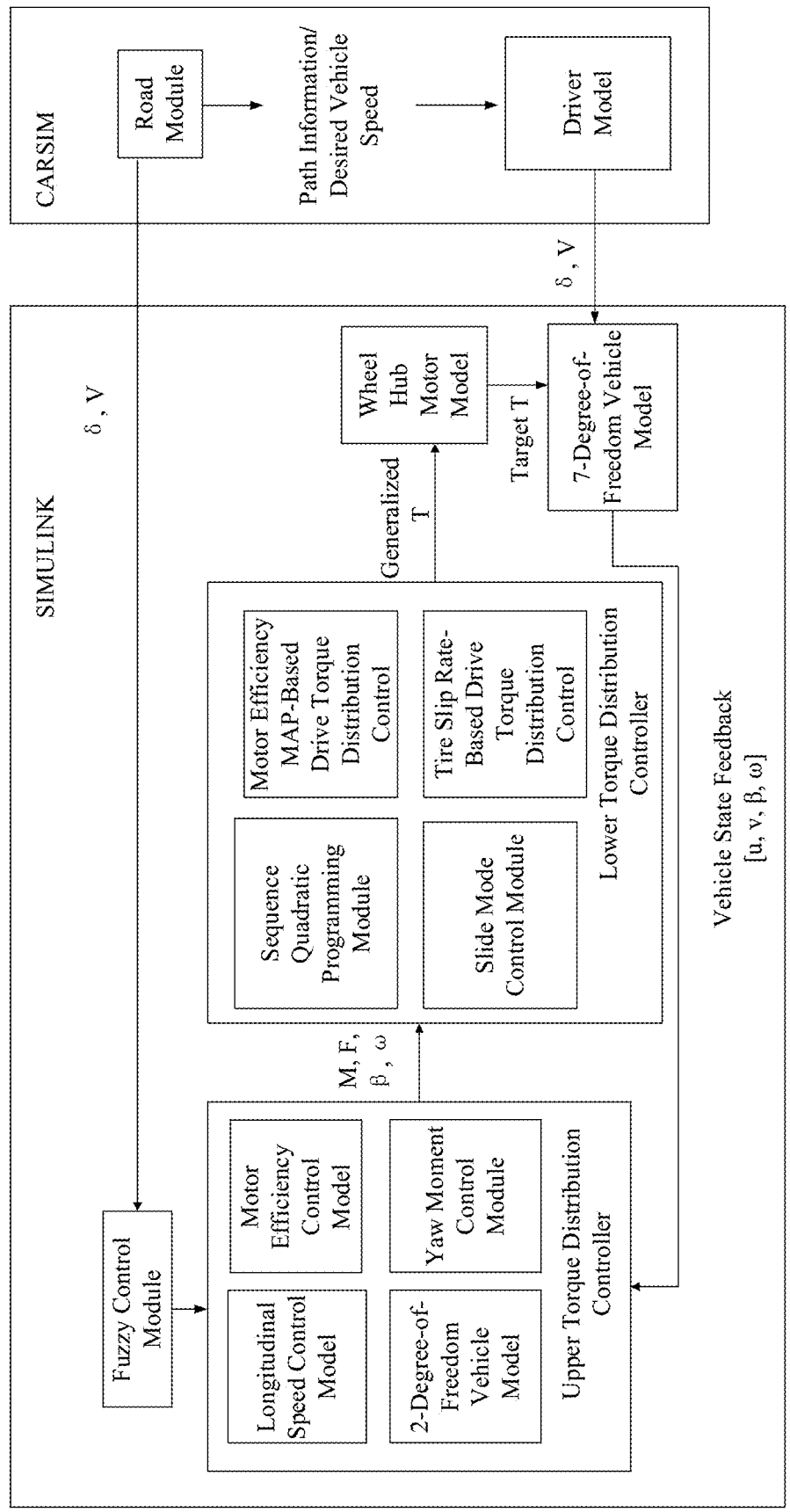

HIERARCHICAL CONTROL METHOD OF TORQUE DISTRIBUTION FOR WHEEL HUB MOTOR-DRIVEN ELECTRIC VEHICLES

TECHNICAL FIELD

The disclosure relates to the field of electric vehicle's wheel hub motor control technologies, and particularly to a hierarchical control system and method of torque distribution for hub motor-driven electric vehicles. Wheel hub motor-driven electric vehicles not only achieve energy-saving effects in propulsion but also enhance handling stability and safety.

BACKGROUND

Wheel hub motor is an integrated motor on the wheel. It is widely regarded as one of the ideal driving forms for electric vehicles because of its simple structure and high transmission efficiency. Wheel hub motors drive the electric vehicle, and motion states of wheels can be independent of each other without rigid mechanical connections, greatly improving transmission efficiency, reducing overall vehicle weight, and simplifying the vehicle structure. Each wheel hub motor is independently controllable, making it easier to achieve energy-saving control while improving handling stability and safety.

Electric vehicles have become a hot topic in the research of new energy vehicles due to their significant advantages in energy conservation and environmental protection. Due to the independent and controllable torques of wheels driven by wheel hub motors, the electric vehicle can control the wheel torque through more flexible control strategies under the premise of meeting requirements of vehicle control. However, the weight of wheel hub motors increases the unsprung weight of the vehicle, which places higher demands on the handling stability and safety of the vehicle. The main driving conditions of electric vehicles driven by wheel hub motors are urban conditions, with frequent acceleration, deceleration, and turning. The range of vehicle speed changes is large, and the efficiency of the motor during driving varies greatly. The present disclosure investigates the rational distribution of drive torque based on the motor efficiency map to achieve energy-saving control. How to provide a hierarchical control method for torque distribution in electric vehicles driven by wheel hub motors to achieve energy-saving driving while improving handling stability and safety has become an urgent technical problem that those skilled in the art need to solve.

SUMMARY

The purpose of the present disclosure is to address the deficiencies in the above background and to provide a hierarchical control system and method for torque distribution of hub motor-driven electric vehicles. The present disclosure can achieve energy-saving effects during driving while also enhancing handling stability and safety through the motor efficiency map-based drive torque distribution control and tire slip rate-based drive torque distribution control.

Technical solutions utilized by the present disclosure are as follows.

A hierarchical control system for torque distribution of hub motor-driven electric vehicles includes: an upper torque distribution controller, a lower torque distribution controller, a wheel hub motor model, a 7-degree-of-freedom vehicle model, a fuzzy control module, a road module and a driver model. The upper torque distribution controller, the lower torque distribution controller, the wheel hub motor model and the 7-degree-of-freedom vehicle model are sequentially connected, and the fuzzy control module and the 7-degree-of-freedom vehicle model are individually connected to the upper torque distribution controller. The road module and the driver model are sequentially connected, the road module is connected to the fuzzy control module, and the driver model is connected to the 7-degree-of-freedom vehicle model.

The upper torque distribution controller includes a longitudinal speed control model, a motor efficiency control model, a 2-degree-of-freedom vehicle model, and a yaw moment control module. The lower torque distribution controller includes motor efficiency map-based drive torque distribution control, a sequence quadratic programming module, tire slip rate-based drive torque distribution control and a slide mode control module.

The fuzzy control module is a fuzzy control model used to execute a fuzzy control method. The road module is a road model which is established in CARSIM software, including sine waveform input conditions, double lane shifting conditions, and snake shaped conditions to verify stability and safety of vehicle operation under typical conditions. The yaw moment control module is a yaw moment control model used to calculate a yaw moment based on a yaw rate and a deviation of the center of mass lateral angle and transmit the yaw moment to the lower torque distribution controller. The sequence quadratic programming module is a sequence quadratic programming model used to solve the nonlinear economic objective function with fmincon function in MATLAB and obtain the maximum comprehensive operating efficiency of the wheel hub motor. The slide mode control module is a slide mode control model used for designing a sliding surface and sliding mode control rate to enable the system to quickly respond and obtain the optimal slip ratio, thereby calculating the target torque based on the relationship between slip ratio and driving torque. The driver model is established in CARSIM software, including two types of open-loop and closed-loop control, the open-loop control requires the driver to only turn the steering wheel by the required angle without making any adjustments, while the closed-loop control requires the driver to continuously adjust the steering wheel based on the path ahead and the specific driving conditions of the vehicle, ensuring that the vehicle can follow the predetermined trajectory. The longitudinal speed control model is used to calculate the driving force to the lower torque distribution controller based on the deviation between the actual vehicle speed and the expected vehicle speed. The motor efficiency control model is used to import the efficiency and torque data into SIMULINK based on the motor efficiency MAP table. The relationship between the input torque and output torque of the wheel hub motor model is represented using a second-order transfer function. The 7-degree-of-freedom vehicle model includes longitudinal, lateral, yaw, and four degrees of freedom for wheel rotation.

By utilizing the above system, the present disclosure further provides a hierarchical control method for torque distribution of hub motor-driven electric vehicles, including following steps:

S1, inputting a path information and a vehicle speed state to the driver model to calculate to obtain a vehicle steering wheel angle $\delta$ and a desired vehicle speed $v_1$; and inputting the vehicle steering wheel angle $\delta$ and the desired vehicle speed $v_1$ to the 7-degree-of-freedom vehicle model and the fuzzy control module;

S2, determining, by using a fuzzy control method (e.g., by the fuzzy control module), a torque distribution control strategy of the upper torque distribution controller; where the torque distribution control strategy is motor efficiency map-based drive torque distribution control or tire slip rate-based drive torque distribution control;

S3, calculating a torque, a yaw velocity and a slide-slip angle and inputting the torque, the yaw velocity, the slide-slip angle to the lower torque distribution controller along with actual values fed back by the hub motor-driven electric vehicle;

S4, performing a torque distribution optimization, by the lower torque distribution controller through using methods of sequence quadratic programming and slide mode control (e.g., by the sequence quadratic programming module and the slide mode control module); and calculating a generalized torque and distributing the generalized torque to the generalized model of wheel hub motors (i.e., the wheel hub motor model); and S5, inputting a target torque to the 7-degree-of-freedom vehicle model; feedbacking, by the 7-degree-of-freedom vehicle model, a vehicle state to the upper torque distribution controller to form a closed-loop control, thereby achieving the drive energy-saving control and improving the handling stability and safety.

In an embodiment, in the S1, information inputted into the driver model includes the path information and the vehicle speed state; information outputted by the driver model includes the vehicle steering wheel angle δ and the desired vehicle speed V.

In an embodiment, the S2 includes: determining statements of turning and skidding of the wheel hub motor-driven electric vehicle through the fuzzy control method to determine the torque distribution control strategy properly for the upper torque distribution controller;

designing a fuzzy controller according to states of the wheel hub motor-driven electric vehicle; using the vehicle steering wheel angle δ and the desired vehicle speed V as fuzzy control inputs; and using a stability state coefficient as a fuzzy control output, denoted as U;

fuzzy subsets of the desired vehicle speed V include: VS representing extremely small, NM representing small, MS representing smaller, Z representing medium, MB representing larger, B representing large, VB representing extremely large;

fuzzy subsets of the steering wheel angle δ include: VS representing extremely small, MS representing small, M representing medium, MB representing large, VB representing extremely large;

fuzzy subsets of the stability state coefficient U include: NB representing negative large, NM representing negative medium, NS representing negative small, ZO representing medium, PS representing positive small, PM representing positive medium, PB representing positive large;

determining a domain for the fuzzy control inputs and the fuzzy control output, and determining fuzzy control rules; finally completing construction of the fuzzy controller in MATLAB/Simulink simulation software;

utilizing the motor efficiency map-based drive torque distribution control when the vehicle is in a straight ahead and not slipping state and in a turning and not slipping state; utilizing the tire slip rate-based drive torque distribution control when the vehicle is in a straight ahead and slipping state and a turning and slipping state.

In an embodiment, the S3 further includes: calculating the yaw velocity and the slide-slip angle through motion differential equations of the two-degree-of-freedom vehicle model as follows:

$$(k_1 + k_2)\beta + \frac{1(ak_1 - bk_2)\omega}{v} - k_1\delta = m(u + v\omega),$$

$$(ak_1 - bk_2)\beta + \frac{1(a^2k_1 - b^2k_2)\omega}{v} - ak_1\delta = I_z\dot{\omega},$$

where v represents a longitudinal velocity, u represents a transverse velocity, β represents the slide-slip angle, ω represents a yaw acceleration, k represents a camber stiffness, $I_z$ represents a vehicle moment of inertia about Z-axis, a represents a distance from a mass center to a front wheel center, b represents a distance from the mass center to a rear wheel center, $k_1$ represents a front wheel total lateral stiffness, and $k_2$ represents a rear wheel total lateral stiffness.

In an embodiment, the S4 further includes: utilizing the motor efficiency map-based drive torque distribution control when the vehicle is in a straight ahead and not slipping state and in a turning and not slipping state; utilizing the longitudinal speed control model and the motor efficiency control model to calculate a driving force, a drive torque and a motor efficiency map; inputting the driving force, the drive torque and the motor efficiency map to the lower torque distribution controller to calculate to obtain the generalized torque based on the motor efficiency map by solving a nonlinear objective function under constraints through a sequence quadratic programming method.

In an embodiment, the S4 further includes: utilizing the tire slip rate-based drive torque distribution control when the vehicle is in a straight ahead and slipping state and a turning and slipping state; calculating and inputting, by the 2-degree-of-freedom vehicle model and the yaw moment control module in the upper torque distribution controller, the yaw velocity w and the slide-slip angle β to the lower torque distribution controller; designing a sliding surface and a slide mode control rate to control a drive torque through the slide mode control module, enabling the hierarchical control system to quickly respond and obtain an optimal tire slip rate; calculating to obtain the generalized torque based on the tire slip rate through a relationship between the tire slip rate and the drive torque.

In an embodiment, the S5 further includes: obtaining the target torque through inputting the generalized torque into the wheel hub motor model; feedbacking, by the 7-degree-of-freedom vehicle model, a transverse velocity u, a longitudinal velocity v, the slide-slip angle β, the yaw velocity ω to form the closed-loop control and achieve energy-saving control during driving while enhancing the handling stability and safety.

The upper torque distribution controller, the lower torque distribution controller, the 7-degree-of-freedom vehicle model, the wheel hub motor model are constructed in the MATLAB/SIMULINK simulation software; the driver model and the road module are constructed in CARSIM simulation software.

The hierarchical control system and method for torque distribution of hub motor-driven electric vehicles provided by the present disclosure have following beneficial effects.

The control method balances drive energy-saving control with the enhancement of handling stability and safety. A hierarchical controller with upper and lower layers has been constructed. The upper torque distribution controller determines the distribution control strategy for drive torque through the fuzzy control module. The lower torque distribution controller receives the torque, the yaw velocity, and the side-slip angle from the upper torque distribution controller, performs drive torque distribution control based on the motor efficiency map or based on the slip rate by using the torque, the yaw velocity, the side-slip angle and actual values fed back by the hub motor-driven electric vehicle, calculates the generalized torque, and assigns it to the wheel hub motor model to obtain the target torque. This target torque is then inputted into the 7-degree-of-freedom vehicle model. The 7-degree-of-freedom vehicle model feeds back the vehicle's state to the upper torque distribution controller, forming a closed-loop control system. This system can reasonably adjust a wheel torque, improve drive efficiency, achieve drive energy-saving control, and simultaneously enhance handling stability and safety.

BRIEF DESCRIPTION OF DRAWING

In order to clearly illustrate the technical solution of the embodiment of the present disclosure, the present disclosure will be explained in conjunction with the accompanying drawing below.

FIGURE illustrates a schematic diagram of a hierarchical control method for torque distribution of hub motor-driven electric vehicles according to an embodiment of the present disclosure.

DETAILED DESCRIPTION OF EMBODIMENTS

It should be understood that the specific embodiments described herein are merely for further explaining the present disclosure, to facilitate a clear understanding of the present disclosure, and are not intended to limit the present disclosure.

As illustrated in the FIGURE, the present disclosure provides a hierarchical control method for torque distribution of hub motor-driven electric vehicles, achieving drive energy-saving effect of the hub motor-driven electric vehicles, and simultaneously enhancing handling stability and safety of the hub motor-driven electric vehicles, by utilizing the hierarchical control method.

As illustrated in the FIGURE, the hierarchical control method for torque distribution of hub motor-driven electric vehicles is implemented by a hierarchical control system for torque distribution of hub motor-driven electric vehicles, and the system includes: an upper torque distribution controller, a lower torque distribution controller, a driver model, a 7-degree-of-freedom vehicle model, a wheel hub motor model, a road module and a fuzzy control module.

The upper torque distribution controller includes a longitudinal speed control model, a motor efficiency control model, a 2-degree-of-freedom vehicle model, and a yaw moment control module. The lower torque distribution controller includes motor efficiency map-based drive torque distribution control, a sequence quadratic programming module, tire slip rate-based drive torque distribution control and a slide mode control module.

Firstly, the driver model receives path information and a vehicle speed state from the road module, and performs calculation based on the path information and the vehicle speed state to obtain a vehicle steering wheel angle $\delta$ and a desired vehicle speed V, the vehicle steering wheel angle $\delta$ and the desired vehicle speed V are outputted by the driver model to the 7-degree-of-freedom vehicle model and the fuzzy control module.

Input variables' precise values are transformed into fuzzy quantities by the fuzzy control module. Fuzzy control rules are determined. The fuzzy quantities are converted into precise values through calculations. Statements of turning and skidding of the hub motor-driven electric vehicle are determined using the fuzzy control method, thereby the torque distribution control strategy for the upper torque distribution controller is determined, which includes two approaches: one is drive torque distribution control based on a motor efficiency map, and the other is drive torque distribution control based on a tire slip rate.

A fuzzy controller is designed according to states of the wheel hub motor-driven electric vehicle. The desired vehicle speed V and a steering wheel angle $\delta$ are used as inputs. A stability state coefficient is used as an output, denoted as U.

Fuzzy subsets of the speed V include: VS representing extremely small, NM representing small, MS representing smaller, Z representing medium, MB representing larger, B representing large, VB representing extremely large.

Fuzzy subsets of the steering wheel angle $\delta$ include: VS representing extremely small, MS representing small, M representing medium, MB representing large, VB representing extremely large.

Fuzzy subsets of the stability state coefficient U include: NB representing negative large, NM representing negative medium, NS representing negative small, ZO representing medium, PS representing positive small, PM representing positive medium, PB representing positive large.

A domain for the fuzzy control inputs and the fuzzy control output is determined, and fuzzy control rules are determined. Construction of the fuzzy controller is completed in MATLAB/Simulink simulation software.

The motor efficiency map-based drive torque distribution control is utilized when the vehicle is in a straight ahead and not slipping state and in a turning and not slipping state. The tire slip rate-based torque distribution control is utilized when the vehicle is in a straight ahead and slipping state and a turning and slipping state.

When the motor efficiency map-based drive torque distribution control is utilized, the longitudinal speed control model and the motor efficiency control model are utilized by the upper torque distribution controller to calculate a driving force, a drive torque and the motor efficiency map and to input the driving force, the drive torque and the motor efficiency map into the lower torque distribution controller. Calculation is done to obtain the generalized torque based on the motor efficiency map by solving a nonlinear objective function under constraints through a sequence quadratic programming method. The lower torque distribution controller continuously optimizes the drive torque in real-time based on vehicle status feedback and the established nonlinear objective function, ensuring that the hub motors operate within their high-efficiency range, thereby achieving energy-saving drive effects for the hub motor-driven electric vehicle.

When the tire slip rate-based drive torque distribution control is utilized, the 2-degree-of-freedom vehicle model and the yaw moment control module are utilized by the upper torque distribution controller to calculate a yaw velocity a and a slide-slip angle $\beta$ to be inputted into the lower torque distribution controller. The yaw velocity a and the slide-slip angle $\beta$ through motion differential equations of the two-degree-of-freedom vehicle model as follows:

$$(k_1 + k_2)\beta + \frac{1(ak_1 - bk_2)\omega}{v} - k_1\delta = m(\dot{u} + v\omega),$$

$$(ak_1 - bk_2)\beta + \frac{1(a^2k_1 - b^2k_2)\omega}{v} - ak_1\delta = I_z\dot{\omega},$$

where v represents a longitudinal velocity, u represents a transverse velocity, β represents the slide-slip angle, $\overline{\omega}$ represents a yaw acceleration, k represents a camber stiffness, $I_z$ represents a vehicle moment of inertia about Z-axis, a represents a distance from a mass center to a front wheel center, b represents a distance from the mass center to a rear wheel center, $k_1$ represents a front wheel total lateral stiffness, and $k_2$ represents a rear wheel total lateral stiffness.

The yaw velocity a and the slide-slip angle β from the upper torque distribution controller are received by the lower torque distribution controller. A proper sliding surface and a slide mode control rate to control a drive torque is designed aiming to make the vehicle to obtain an optimal tire slip rate through a slide mode control algorithm, enabling the hierarchical control system for torque distribution of hub motor-driven electric vehicles to quickly respond and obtain the optimal tire slip rate. The generalized torque is calculated based on the tire slip rate through a relationship between the tire slip rate and the drive torque. The lower torque distribution controller continuously optimizes the drive torque in real-time based on vehicle status feedback and slide mode control module, maintaining the optimal slip rate to enhance the handling stability and safety of the hub motor-driven electric vehicle.

A target torque is obtained by inputting the generalized torque outputted by the lower torque distribution controller into the wheel hub motor mode. A transverse velocity u, a longitudinal velocity v, the slide-slip angle β, the yaw velocity ω are fed back by the 7-degree-of-freedom vehicle model to form the closed-loop control and achieve energy-saving control during driving the hub motor-driven electric vehicle while enhancing the handling stability and safety.

The upper torque distribution controller, the lower torque distribution controller, the 7-degree-of-freedom vehicle model, the wheel hub motor model are constructed in MATLAB/Simulink simulation software. The driver model and the road module are constructed in CARSIM simulation software. After completing construction, effects of the hierarchical control method for torque distribution of hub motor-driven electric vehicles on energy-saving controlling while improving handling stability and safety are verified through a combined simulation of the CARSIM and the MATLAB/SIMULINK simulation software.

The above are merely preferred embodiments of the present disclosure and should not be used to limit the scope of the present disclosure. Therefore, any equivalent variations made according to the scope of the application of the present disclosure are still within the scope of protection of the present disclosure.

What is claimed is:

1. A hierarchical control method for torque distribution of hub motor-driven electric vehicles, utilizing a hierarchical control system for torque distribution of hub motor-driven electric vehicles, wherein the hierarchical control system comprises: an upper torque distribution controller, a lower torque distribution controller, a wheel hub motor model, a 7-degree-of-freedom vehicle model, a fuzzy control module, a road module and a driver model; the upper torque distribution controller, the lower torque distribution controller, the wheel hub motor model and the 7-degree-of-freedom vehicle model are sequentially connected in that order, the fuzzy control module and the 7-degree-of-freedom vehicle model are individually connected to the upper torque distribution controller, the road module and the driver model are sequentially connected, the road module is connected to the fuzzy control module, and the driver model is connected to the 7-degree-of-freedom vehicle model;

wherein the upper torque distribution controller comprises a longitudinal speed control model, a motor efficiency control model, a 2-degree-of-freedom vehicle model, and a yaw moment control module;

wherein the lower torque distribution controller comprises motor efficiency map-based drive torque distribution control, a sequence quadratic programming module, tire slip rate-based drive torque distribution control and a slide mode control module;

wherein the hierarchical control method comprises following steps:

S1, inputting a path information and a vehicle speed state to the driver model to calculate to obtain a vehicle steering wheel angle δ and a desired vehicle speed V; and inputting the vehicle steering wheel angle δ and the desired vehicle speed V to the 7-degree-of-freedom vehicle model and the fuzzy control module;

S2, determining, by using a fuzzy control method, a torque distribution control strategy for the upper torque distribution controller; wherein the torque distribution control strategy is the motor efficiency map-based drive torque distribution control or the tire slip rate-based drive torque distribution control;

S3, calculating a torque, a yaw velocity and a slide-slip angle, and inputting the torque, the yaw velocity, the slide-slip angle to the lower torque distribution controller together with actual values fed back by a hub motor-driven electric vehicle;

S4, performing a torque distribution optimization, by the lower torque distribution controller through using methods of sequence quadratic programming and slide mode control; and calculating a generalized torque and distributing the generalized torque to the wheel hub motor model; and S5, inputting a target torque to the 7-degree-of-freedom vehicle model; feedbacking, by the 7-degree-of-freedom vehicle model, a vehicle state to the upper torque distribution controller to form a closed-loop control.

2. The hierarchical control method as claimed in claim 1, wherein the S2 comprises: determining statements of turning and skidding of the wheel hub motor-driven electric vehicle through the fuzzy control method to determine the torque distribution control strategy for the upper torque distribution controller;

designing a fuzzy controller according to states of the wheel hub motor-driven electric vehicle; using the vehicle steering wheel angle d and the desired vehicle speed V as fuzzy control inputs; and using a stability state coefficient as a fuzzy control output, denoted as U;

fuzzy subsets of the desired vehicle speed V comprise: VS representing extremely small, NM representing small, MS representing smaller, Z representing medium, MB representing larger, B representing large, VB representing extremely large;

fuzzy subsets of the vehicle steering wheel angle δ comprise: VS representing extremely small, MS representing small, M representing medium, MB representing large, VB representing extremely large;

fuzzy subsets of the stability state coefficient U comprise: NB representing negative large, NM representing negative medium, NS representing negative small, ZO representing medium, PS representing positive small, PM representing positive medium, PB representing positive large;

determining a domain for the fuzzy control inputs and the fuzzy control output, and determining fuzzy control rules; finally completing construction of the fuzzy controller in MATLAB/SIMULINK simulation software;

utilizing the motor efficiency map-based drive torque distribution control when the vehicle is in a straight ahead and not slipping state and in a turning and not slipping state; utilizing the tire slip rate-based drive torque distribution control when the vehicle is in a straight ahead and slipping state and a turning and slipping state.

3. The hierarchical control method as claimed in claim 1, wherein the S3 further comprises:

calculating the yaw velocity and the slide-slip angle through motion differential equations of the two-degree-of-freedom vehicle model as follows:

$$(k_1 + k_2)\beta + \frac{1(ak_1 - bk_2)\omega}{v} - k_1\delta = m(\dot{u} + v\omega),$$

$$(ak_1 - bk_2)\beta + \frac{1(a^2k_1 - b^2k_2)\omega}{v} - ak_1\delta = I_z\dot{\omega},$$

where v represents a longitudinal velocity, u represents a transverse velocity, $\beta$ represents the slide-slip angle, $\dot{\omega}$ represents a yaw acceleration, k represents a camber stiffness, $I_z$ represents a vehicle moment of inertia about Z-axis, a represents a distance from a mass center to a front wheel center, b represents a distance from the mass center to a rear wheel center, $k_1$ represents a front wheel total lateral stiffness, and $k_2$ represents a rear wheel total lateral stiffness.

4. The hierarchical control method as claimed in claim 1, wherein the S4 further comprises: utilizing the motor efficiency map-based drive torque distribution control when the vehicle is in a straight ahead and not slipping state and in a turning and not slipping state; utilizing the longitudinal speed control model and the motor efficiency control model to calculate a driving force, a drive torque and a motor efficiency map; inputting the driving force, the drive torque and the motor efficiency map to the lower torque distribution controller to calculate to obtain the generalized torque based on the motor efficiency map by solving a nonlinear objective function under constraints through a sequence quadratic programming method.

5. The hierarchical control method of torque distribution for hub motor-driven electric vehicles as claimed in claim 1, wherein the S4 further comprises: utilizing the tire slip rate-based drive torque distribution control when the vehicle is in a straight ahead and slipping state and a turning and slipping state; calculating and inputting, by the 2-degree-of-freedom vehicle model and the yaw moment control module in the upper torque distribution controller, the yaw velocity $\omega$ and the slide-slip angle $\beta$ to the lower torque distribution controller; designing a sliding surface and a slide mode control rate to control a drive torque through the slide mode control module, enabling the hierarchical control system to quickly respond and obtain an optimal tire slip rate; calculating the generalized torque based on the tire slip rate through a relationship between a tire slip rate and the drive torque.

6. The hierarchical control method as claimed in claim 1, wherein the S5 further comprises: obtaining the target torque through inputting the generalized torque into the wheel hub motor model; feedbacking, by the 7-degree-of-freedom vehicle model, a transverse velocity u, a longitudinal velocity v, the slide-slip angle $\beta$, the yaw velocity $\omega$ to form the closed-loop control and achieve energy-saving control during driving the hub motor-driven electric vehicle while enhancing handling stability and safety.

\* \* \* \* \*